United States Patent [19]

Cotton

[11] 4,115,755
[45] Sep. 19, 1978

[54] AERODYNAMIC SURFACE LOAD SENSING

[75] Inventor: Lou S. Cotton, Monroe, Conn.

[73] Assignee: United Technologies Corporation, Hartford, Conn.

[21] Appl. No.: 695,501

[22] Filed: Jun. 11, 1976

[51] Int. Cl.² .............................................. G08B 21/00
[52] U.S. Cl. .............................. 340/27 R; 73/178 H; 244/17.13; 340/407; 364/426
[58] Field of Search ............ 340/27 R, 27 AT, 27 SS, 340/407; 244/17.11, 17.13, 191; 235/150.2; 73/178 H, 65; 364/426, 424

[56] References Cited

U.S. PATENT DOCUMENTS

| | | | |
|---|---|---|---|
| 3,520,499 | 7/1970 | Ask | 244/17.13 |
| 3,590,636 | 7/1971 | Eddy | 73/178 H |
| 3,618,002 | 11/1971 | Stinson | 340/27 R |
| 3,733,039 | 5/1973 | O'Connor et al. | 244/17.13 |
| 4,032,083 | 6/1977 | Maciolek | 73/178 H |

FOREIGN PATENT DOCUMENTS 2,019,213  11/1970  Fed. Rep. of Germany ........ 244/17.13

Primary Examiner—John W. Caldwell, Sr.
Assistant Examiner—James J. Groody
Attorney, Agent, or Firm—M. P. Williams

[57] ABSTRACT

The factors (including collective pitch, weight, altitude density, rotor speed and airspeed) which determine the extent to which the rotor of a helicopter may be loaded, are fed into a look-up table, and the permissible acceleration normal to the rotor is compared against actual acceleration normal to the rotor, an alarm signal resulting whenever the actual exceeds the permissive; the alarm signal may be utilized to shake the collective stick so as to simulate pre-overload vibration as a warning to the pilot.

4 Claims, 1 Drawing Figure

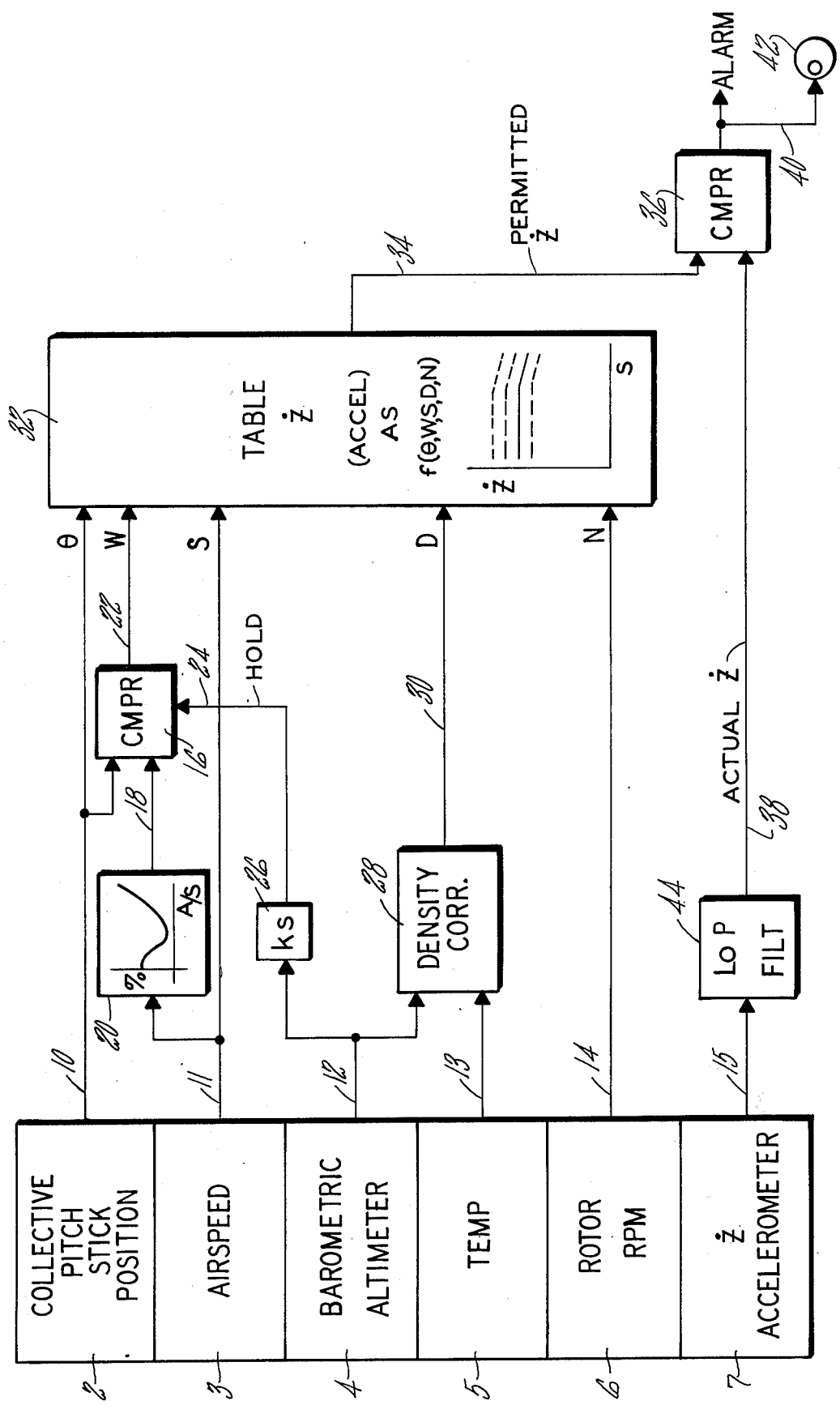

AERODYNAMIC SURFACE LOAD SENSING

The invention disclosed herein was made in the course of or under a contract with the Department of the Army.

BACKGROUND OF THE INVENTION

1. Field of the Invention

This invention relates to helicopter controls, and more particularly to controls enabling flying of a helicopter to maximum loading within its structural envelope.

2. Description of the Prior Art

As is known, the loads in the rotor system of a helicopter may vary widely as a function of airspeed; at certain airspeeds, slight vertical maneuvering can cause vast changes in rotor load. This is particularly true at high airspeeds, wherein the retracting blade travels at such a low rate of speed that it has relatively small lift, which results in excessive loading of one side of the rotor, which in turn causes vibration that can become severe, and alternately results in blade stall. In the older and simpler helicopters, vibration feeds back through the control system to the collective pitch control stick, such that the pilot, by sensing the vibration, can fly the aircraft at high performance, without exceeding safe loads. In large and sophisticated helicopters, the utilization of control systems which isolate the rotor from the sticks which control it together with design improvements which reduce the amount of vibration as a function of loading, have resulted in loss of the vibration-indication of rotor blade loading. As a substitute it is known to measure the force required for the main rotor actuating mechanism to move the swashplate (which alters the pitch of the blades) by means of an electromechanical transducer, which provides an indication of rotor loading on a cockpit panel instrument, called a cruise guide indicator. However, load measurement devices have been found to be extremely inaccurate and unreliable; and, concentration on a load indicator detracts from the maneuvering in which the pilot is involved. Additionally, the amount of loading varies as a function of a number of variables within the extremes of the structural envelope. Therefore, maneuvering the aircraft to any particular load as indicated by a force or load measuring device could not permit maximum maneuvering of the aircraft within the structural envelope.

SUMMARY OF THE INVENTION

Objects of the present invention include provision of improved measurements of permissible load in the helicopter and improved operation of the helicopter within its structural envelope.

According to the present invention, the actual acceleration of the aircraft is compared against the permissible acceleration in the same direction as determined from flight test performance data, based on actual flight conditions obtaining; and the actual acceleration exceeding the permissible acceleration results in an alarm, such as shaking of the collective pitch control lever of the helicopter.

According further to the present invention, the structural envelope of the aircraft, as defined by weight, airspeed, rotor RPM, air density and collective pitch stick position, is utilized to provide an indication of permissible loading of the rotor. In accordance still further with the invention, the rough indication of the aircraft weight is determined, when the aircraft is not in a vertical maneuver, by comparing collective pitch stick position against a function of the expected collective pitch stick for a given airspeed of a nominally-weighted aircraft. In a further accord with the invention, a gross measure of the aircraft weight, density of the air, airspeed, the collective pitch and rotor speed of the aircraft are utilized as indices of a table look-up to determine the maximum permissible aircraft acceleration under such flight conditions, which is compared against the actual aircraft acceleration, to determine when the aircraft is maneuvered close to a loading which exceeds its structural envelope.

The invention avoids the use of erroneous load measuring devices and also avoids complex attachments to and around the swashplates and other portions of the rotor of a helicopter, while at the same time providing an indication of the actual and permissible loading of the rotor. The invention takes into account different conditions which obtain during the maneuvering of the aircraft in order to permit maneuvering closer to the limits of the structural envelope, rather than maneuvering the aircraft within a fixed load limit as in the prior art.

The foregoing and other objects, features and advantages of the present invention will become more apparent in the light of the following detailed description of preferred embodiments thereof, as illustrated in the accompanying drawing.

BRIEF DESCRIPTION OF THE DRAWING

The sole FIGURE herein comprises a simplified schematic block diagram of a preferred embodiment of the present invention.

DESCRIPTION OF THE PREFERRED EMBODIMENTS

Referring now to the drawing, a plurality of sensors 2-7 provide manifestations at related outputs 10-15 of: the position ($\theta$) of the collective pitch control stick, the airspeed (S), the barometric altitude, the temperature, the speed of the rotor (N), and the actual acceleration ($\dot{Z}$), respectively. The collective pitch position signal ($\theta$) on the line 10 is applied to a comparator 16, the other input of which is provided on a line 18 by a function generator 20 which is responsive to the airspeed signal (S) on the line 11 to generate a signal indicative of the empirical or design value of the collective pitch stick position for each aircraft speed for a nominal or median design aircraft weight. The function generator 20, if responding to an analog airspeed signal, may comprise a well-known diode break-point or other form of analog function generator; on the other hand, if desired, it may comprise a simple table look-up memory responsive to digital input signals, in dependence on the particular implementation of that portion of the system as may suit any design requirements. By comparing the expected collective pitch position as indicated by the signal on the line 18 with the actual collective pitch stick position as indicated by the signal on the line 10, an indication of whether the aircraft is loaded heavy or loaded light can be obtained. This is achieved by comparing the two signals in the comparator 16 so as to provide a weight signal (W) on a line 22 which may most simplistically be a logic level, the presence of which indicates that the aircraft is heavier than nominal and the absence of which indicates that the aircraft is lighter than nominal; on the other hand, if increasing complexity can be tolerated and greater accuracy is required, full subtraction can be utilized in place of the comparator 16 so that a signal having a variable value may be provided at the output 22, in a manner which is described more fully hereinafter. In order to prevent a weight determination in the comparator 16 when the aircraft is either artificially heavy or light due to vertical accelerations in either the up or down direction (respectively), a hold signal is provided on a line 24 from a differentiator 26 which is responsive to the barometric altitude signal on the line 12 to provide the hold signal whenever the altitude is undergoing a rate of change (or if desired, a rate of change in excess of some given small threshold value). Assuming the comparator 16 is digital and provides its discrete indication on the line 22 in dependence upon the signal on the line 10 being greater or lesser than the signal on the line 18, the hold function may simply be provided by a D-type flip flop, the D input of which follows the comparator 16, and the clock input of which is fed by suitable clock signals gated by the hold signal on the line 24. The clock signals are not applied to the D-type flip flop whenever the hold signal is present, whereby the last state of the flip flop will remain until the next time that the barometric altitude becomes steady. In point of fact, since weight of the aircraft will vary only slowly in flight as fuel is used during flight, relatively few samplings of the comparator will ever be required.

The output of the barometric altimeter on the line 12 and the output of the temperature sensor on the line 13 are applied to a density correction circuit 28 which is of a well-known type. If the signals on the lines 12 and 13 are analog signals, density correction 28 may be provided by a simple divide circuit which forms a ratio of altitude (analogous to pressure) to temperature, times some constant (which may include the inverse of the uniform gas constant for atmosphere) which may be followed by a break-point diode function generator to account for any nonlinearities in the relationship to the degree of accuracy which may be desired in any case. However, it should be clear that the present invention does not require a fine tooth indication of density, but rather an assurance of the approximate density. On the other hand, if the barometric altimeter 4 and temperature sensor 5 provide digital signals on the lines 12, 13, then the density correction apparatus 28 may simply be a table look-up memory which provides a unique density for every combination of altitude and temperature applied to the input thereof.

Signals on the lines 10, 22, 11, 30 and 14 (which respectively represent collective pitch stick position $\theta$, weight W, airspeed S, density D, and rotor speed N) are all applied to a table look-up device 32 which has stored therein a family of permissible accelerations ($\ddot{Z}$) as a function of airspeed. For any airspeed S, depending upon the other four variables, there will be one unique acceleration ($\ddot{Z}$) indicative of rotor loading that is permissible within the structural envelope of the aircraft while those conditions obtain. As any of the conditions change, so does the value provided by the table. Stated alternatively, the table 32 may comprise a look-up read only memory for which the address is a compound function of all of the inputs ($\theta$, W, S, D and N). Thus the table 32 provides on an output line 34 a signal indicative of the permitted acceleration ($\ddot{Z}$) which is compared in the comparator 36 with a signal on a line 38 representing the current actual acceleration (actual $\ddot{Z}$), and whenever the actual value exceeds the permitted value, the compare circuit 36 provides an output signal on a line 40 which is utilized as an alarm. The alarm may be visual or audible. Or, it may be in the form of vibration induced in the collective pitch control stick by means of an electric motor 42 which rotates an eccentric weight connected to the stick, thereby to induce vibration in it, in a well-known fashion; this is advantageous since it provides vibration in the collective stick which has long been used by the pilot as a natural indication of a propensity to exceed the structural envelope of the aircraft.

The signal on the line 38 is provided by a low-pass filter in response to the output of the accelerometer 7 on the line 15, the low-pass filter 44 simply filtering out vibrations and the effects of gusts and the like which are of no interest to the present invention. The table look-up 32 contains unique values of permissible acceleration for any given airspeed, as a function of collective pitch, weight, density and rotor speed; it reflects information stored therein which is empirically determined, such as may be derived from performance data acquired during flight testing. On the other hand, it is possible to utilize data within the table 32 which is derived from design analysis (expected performance), although this is less of a safe course of action than the use of empirically derived data. The table may itself simply comprise a digitally addressed table look-up read only memory as described hereinbefore, or the table may comprise a series of multiplications and function generations which directly reflect the effect of each input on the output, in a well-known fashion. The degree of accuracy desired can materially alter the complexity required, particularly in any analog embodiment.

It should be understood, however, that the invention is not in the implementation of any of the particular apparatus shown in the exemplary embodiment of the drawing, but rather in the overall system. Further, although the invention has been shown and described with respect to an exemplary embodiment thereof, it should be understood by those skilled in the art that the foregoing and various other changes, omissions and additions may be made therein and thereto without departing from the spirit and the scope of the invention.

Having thus described a typical embodiment of my invention, that which I claim as new and desire to secure by Letters Patent is:

1. In a helicopter, navigation apparatus comprising:
speed means providing a signal indicative of the airspeed of the helicopter;
means responsive to the output of said speed means for providing a design collective pitch signal indicative of a predetermined collective pitch stick position associated with the particular speed indicated by the output signal of said speed means as a function of the nominal weight of the helicopter, said design collective pitch signal continuously varying with airspeed in a manner according to a predetermined function;
collective pitch stick position sensing means for providing an actual collective pitch signal indicative of the actual position of the collective pitch control stick;
comparison means responsive to both of said collective pitch signals to provide an output weight signal indicative of a relationship of the actual weight of the helicopter to said nominal weight;
barometric altimeter sensing means for providing an altimeter signal indicative of the altitude of the aircraft;
differentiator means responsive to said altimeter signal to provide a hold signal indicating vertical maneuvering of the aircraft, said comparison means being responsive to said hold signal to continuously provide the last weight signal prior to the appearance of said hold signal until said hold signal disappears;

temperature sensing means for providing a signal indicative of the temperature of the atmosphere surrounding the aircraft;

density correction means responsive to said altimeter signal and to said temperature signal for providing a signal indicative of the density of the atmosphere surrounding said aircraft;

rotor speed sensing means for providing a signal indicative of rotor speed; and means responsive to said collective pitch signal, said weight signal, said airspeed signal, said density signal, and said rotor speed signal for providing a signal in response thereto which is indicative of the aircraft acceleration corresponding to permissible loading of the aircraft within the structural envelope thereof.

2. Apparatus according to claim 1 further comprising:

means including an accelerometer for providing a signal indicative of the actual acceleration in the helicopter; and means responsive to said permitted acceleration signal and said actual acceleration signal for providing an alarm signal whenever the actual acceleration exceeds the permitted acceleration.

3. Apparatus according to claim 2 further comprising:

means responsive to said alarm signal for shaking the collective pitch stick of the helicopter.

4. Helicopter navigation apparatus comprising:

means including an accelerometer for providing a signal indicative of the acceleration of the aircraft;

a plurality of condition means respectively providing signals indicative of density of the helicopter ambient atmosphere and collective pitch, weight, airspeed, and rotor speed of the helicopter;

means responsive to said condition means for providing a signal indicative of a permitted vertical acceleration corresponding, for all of the conditions represented by said signals, to a rotor load within the structural envelope of said helicopter; and means for comparing said permitted acceleration signal with said actual acceleration signal to generate a signal indicative of whether or not the actual acceleration exceeds the value thereof related to proper loading of the aircraft within the structural envelope.

* * * * *